UNITED STATES PATENT OFFICE.

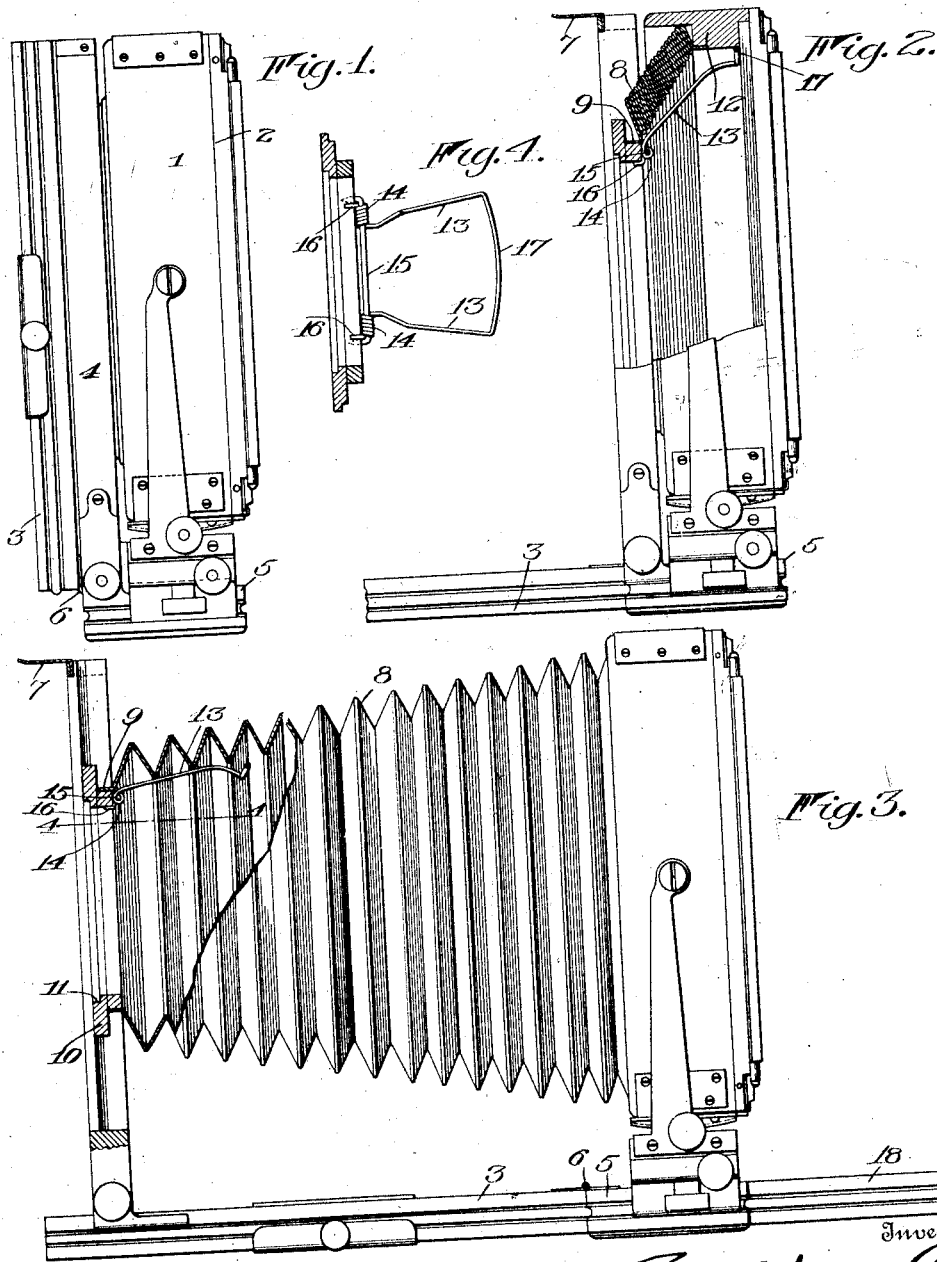

CHARLES E. HUTCHINGS, OF ROCHESTER, NEW YORK, ASSIGNOR TO EASTMAN KODAK COMPANY, OF ROCHESTER, NEW YORK, A CORPORATION OF NEW YORK.

BELLOWS-SUPPORT FOR PHOTOGRAPHIC APPARATUS.

987,232.

Specification of Letters Patent. Patented Mar. 21, 1911.

Application filed September 28, 1909. Serial No. 519,946.

*To all whom it may concern:*

Be it known that I, CHARLES E. HUTCHINGS, of Rochester, in the county of Monroe and State of New York, have invented certain new and useful Improvements in Bellows-Supports for Photographic Apparatus; and I do hereby declare the following to be a full, clear, and exact description of the same, reference being had to the accompanying drawings, forming a part of the specification, and to the numerals marked thereon.

My present invention relates to photography and it has for its object to provide a simple and efficient device in combination with such photographic apparatus as employ extensible bellows for bracing the intermediate portions of the latter and supporting them against sagging when in an extended, or more particularly, partially extended, condition.

To these and other ends the invention consists in certain improvements and combinations of parts all as will be hereinafter more fully described, the novel features being pointed out in the claims at the end of the specification.

In the drawings: Figure 1 is a side elevation of a photographic apparatus of a type to which my improvements are applicable, shown in folded position. Fig. 2 is a similar view, the apparatus being shown partly in longitudinal central section to illustrate, in folded position, a bellows supporting device constructed in accordance with and illustrating one embodiment of my invention. Fig. 3 is a similar elevation but with the apparatus extended including the bellows which are shown partly in section to reveal the supporting brace and, Fig. 4 is a detail horizontal section through one of the frames to which the ends of the bellows are attached, taken substantially on the line 4—4 of Fig. 3.

Similar reference numerals in the several figures indicate the same parts.

Though my improvements are applicable to nearly all photographic appliances embodying the familiar bellows construction, I have herein illustrated the present exemplary embodiment thereof in connection with its useful application to a folding camera embodying a body frame or portion 1, back 2 and bed 3 upon which latter is adapted to travel the camera front 4 toward and from the body frame 1, the latter being also movable on the main body 5 and, if desired, on a suitable detachable extension thereof (not shown), all for well understood focusing purposes. The bed 3 is, in the present instance, hinged to the body 5 at 6 and arranged to fold as shown in Fig. 1 against the front 4 when the latter is retracted against the body frame 1 and to be secured thereto by a device 7.

A bellows 8 is connected at 9 to and supported at its forward end on a lens board frame 10 which seats the lens (not shown) at 11 and is itself, in the present instance, movable vertically on the front 4. The rear end of the bellows is similarly connected with the body frame 1 at 12 as shown in Fig. 2.

In the practice of my invention, a spring pressed supporting brace 13 is pivoted at 14 on a bar 15 carried on the rear or inner side of the lens board frame 10, the tendency to movement of the brace being upward so that, in the folded position of the camera parts it assumes an angular position within the body frame 1, as shown in Fig. 2, permitted by the difference in size of the frames, the frame 10 being the smaller. When the latter is moved outwardly on the front 4 to the position of Fig. 3, and the supports of the bellows ends are thus separated, it is well known to those skilled in the art that the intermediate portions of the bellows are apt to sag and if they do so to any great extent they will intercept the cone of light from the camera lens and obscure portions of the field of exposure. This is particularly so when the bellows is extended less than its maximum capacity and hence under little or no longitudinal strain which would tend to straighten or stiffen it. With the present improvements, however, the brace 13 assumes the substantially horizontal position of Fig. 3 within the bellows, when the latter are drawn out, to extend longitudinally along and in close contact with an inner face thereof and exerts its upward pressure upon the intermediate portions to prevent any sagging sufficient to disturb the image. With a refolding of the camera, the load of the bellows is taken off of the brace which reassumes the inoperative position of Fig. 2.

In my preferred construction of the details of the brace 13, I form it in the nature of a yoke of one continuous piece of spring wire, the arms 13 of the yoke being wound about the bar 15 at 14 to constitute torsional coiled springs the extremities 16 acting against the supporting frame 10, as shown. The connecting portion 17 of the yoke is preferably offset in a different plane to render it durable in its contact with the camera back or other parts when in the folded position of Fig. 2.

A device constructed in accordance with my invention and offering the advantages of my improvements may be furnished at an insignificant cost and may be attached, it is pointed out, to most any bellows, whether figured in the original construction of the camera or other apparatus, or not.

The improvement will show its value more particularly after the bellows has been in use for a considerable length of time and a limpness of the material has taken the place of the stiffness present when the parts are new.

I claim as my invention.

1. In a photographic apparatus, the combination with a bellows and two relatively movable supports connected with the ends thereof, of a brace for the bellows when extended, embodying a transverse portion engaging the latter at an intermediate point and supporting arms for such portion carried on one of the supports and projecting longitudinally of the bellows.

2. In a photographic apparatus, the combination with a bellows and two relatively movable supports connected with the ends thereof, of a brace for the bellows when extended, arranged interiorly thereof, and engaging the latter at an intermediate point, said brace embodying an arm pivoted to one of the supports independently of the other.

3. In a photographic apparatus, the combination with a bellows and two relatively movable supports connected with the ends thereof, of a spring actuated brace for the bellows when extended, arranged interiorly thereof and tending to move against and resiliently support the latter at an intermediate point, said brace being carried by one of the supports.

4. In a photographic apparatus, the combination with a bellows and two relatively movable supports connected with the ends thereof, of a spring actuated brace for the bellows when extended, arranged interiorly thereof and tending to move against and resiliently support the latter at an intermediate point, said brace being carried by one of the supports and adapted to automatically assume an inoperative position within and against the other and out of contact with the bellows when said supports are moved together to fold the bellows and relieve the load on the brace.

5. In a photographic apparatus, the combination with a bellows and two relatively movable supporting frames connected with the ends thereof, one of said frames being smaller than the other, of a spring actuated brace for the bellows when extended, arranged interiorly thereof and engaging the latter at an intermidate point, said brace being carried by the smaller frame to extend substantially horizontally when in operative position and being adapted to swing upwardly to an inoperative position within and against the larger frame when said frames are moved together to fold the bellows and relieve the load on the brace.

6. In a photographic apparatus, the combination with a bellows and a supporting frame at one end thereof, of a spring pressed yoke on the interior of the bellows comprising arms and a connecting portion at their outer ends, the latter extending transversely of the bellows and tending to move against and resiliently support the same, and a bar on the frame upon which the inner ends of the arms are pivoted.

CHARLES E. HUTCHINGS.

Witnesses:
 RUSSELL B. GRIFFITH,
 WALTER B. PAYNE.